Dec. 4, 1945.　　　　　E. F. FLINT　　　　　2,390,361
MEDIAN DEVICE
Original Filed Feb. 25, 1941　　3 Sheets-Sheet 1

EDWARD F. FLINT
INVENTOR

BY *G. A. Ellestad*
ATTORNEY

Dec. 4, 1945.  E. F. FLINT  2,390,361
MEDIAN DEVICE
Original Filed Feb. 25, 1941   3 Sheets-Sheet 2
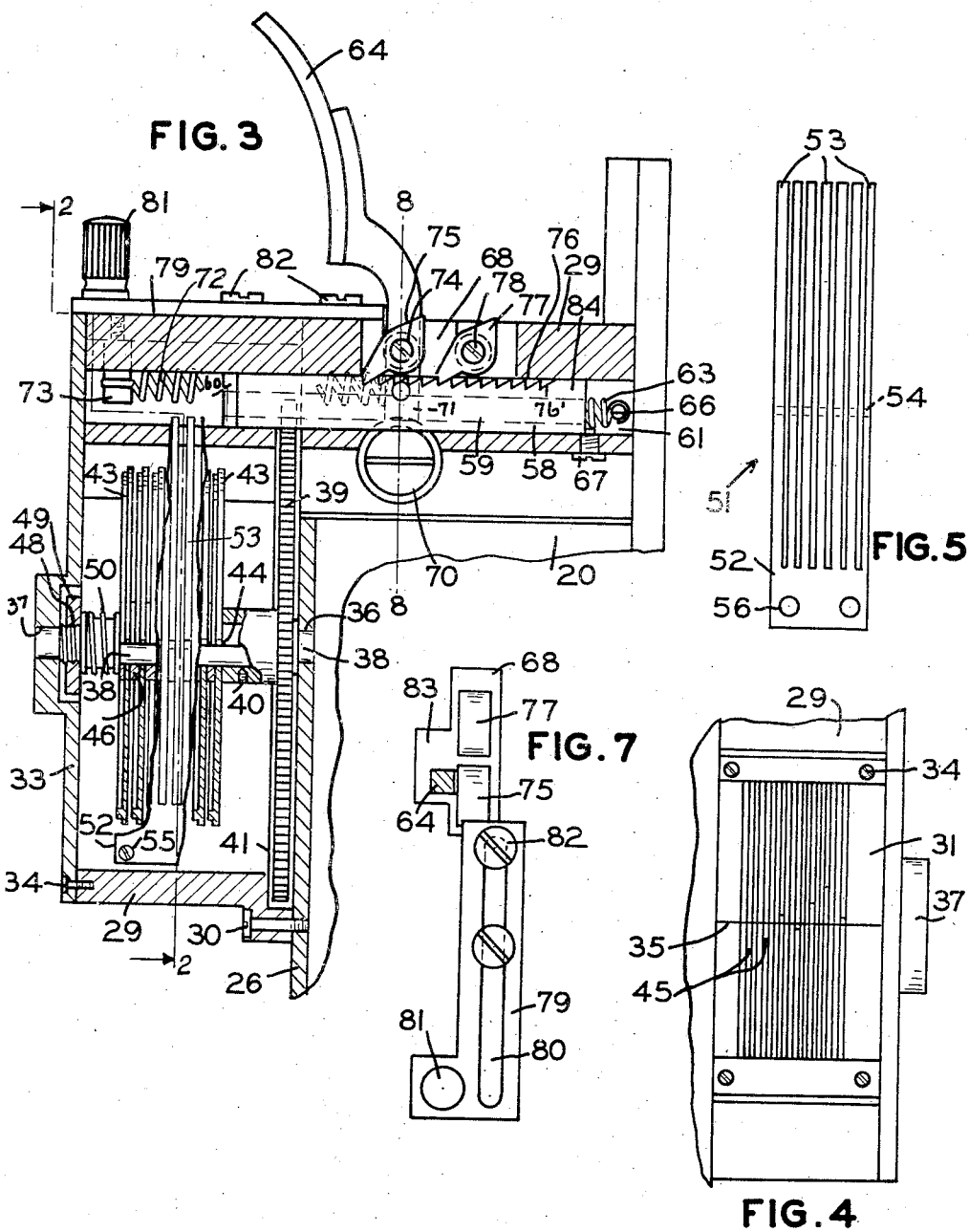
EDWARD F. FLINT
INVENTOR
BY *[signature]*
ATTORNEY Dec. 4, 1945.   E. F. FLINT   2,390,361
MEDIAN DEVICE
Original Filed Feb. 25, 1941   3 Sheets-Sheet 3

EDWARD F. FLINT
INVENTOR

BY *G. A. Ellestad*
ATTORNEY

Patented Dec. 4, 1945

2,390,361

UNITED STATES PATENT OFFICE 2,390,361

MEDIAN DEVICE

Edward F. Flint, Rochester, N. Y., assignor to Bausch & Lomb Optical Company, Rochester, N. Y., a corporation of New York Continuation of application Serial No. 380,528, February 25, 1941. This application September 25, 1941, Serial No. 412,275

19 Claims. (Cl. 33—70)

My invention relates to calculating mechanism and more especially is concerned with a device for obtaining the median value of a group of quantitative measurements.

Frequently it becomes desirable to determine some single value which will be representative of the separate values of a group of quantitative measurements. Several methods are known for finding a value of this character.

One of these, the median method, is basically designed to ascertain such a representative value for a group composed of an odd number of measurements. The median of the group is obtained by checking off the measurements thereof in an ascending or descending order of magnitude until the middle measurement is reached. For example, in a group of seven measurements, the median value will be the fourth largest measurement of the group.

Another method utilizes the mean or the average value of a group of measurements. The mean is found by dividing the sum of the magnitudes of the measurements by the total number of measurements making up the group.

Averaging devices now known, in general possess a complicated design and are subject to the criticism that they are difficult to keep in proper adjustment. The serious nature of this latter defect becomes apparent when it is considered that any error in the averaging device will be combined with any error in the values which are being averaged.

Obviously the median method will greatly speed up and eliminate much of the work of averaging and, due to its simplicity, will readily lend itself to embodiment in calculating mechanism. In addition to the major object of my invention of providing calculating mechanism which lacks those defects inherent in prior art devices, I also have as an object, the provision of a device of this character which utilizes the relative positions of index marks on movable indicating members to determine the median of a group of measurements or other indicia of quantity.

Another object is to provide a median device wherein a plurality of indicating members may be set in definite positions with respect to each other and while being maintained in such relation may be moved with reference to a fiducial line and caused to indicate the median value of a group of quantitative measurements. As another object I contemplate the provision of means designed to prevent the introduction of error into the median value to be indicated by a median device when it is inadvertently manipulated after the location of the median. Yet a further object of my invention is to provide a median device of the character described which may be used with many types of measuring instruments.

With these and other objects in view, which may be incident to my improvements, the invention consists in the parts and combinations to be hereinafter set forth and claimed, with the understanding that the several necessary elements comprising my invention may be varied in construction, proportion and arrangement without departing from the spirit of the invention or exceeding the scope of the appended claims.

In order to make my invention more clearly understood, I have shown in the accompanying drawings, wherein similar parts are designated by like reference characters, means for carrying the invention into practical effect without limiting the improvements in their useful applications to the particular constructions, which for the purpose of explanation have been made the subject of illustration. To this end the invention is disclosed in the following manner, wherein:

Figure 3 is a view taken at right angles to Figure 2 with parts in section and in elevation.

Figure 4 is a face view looking into the observation window.

Figure 5 is a face view of the detent fingers used with the device to control the movement of certain parts thereof.

Figure 6 is a detail plan view of the detent fingers and the contact means for moving them out of their normal position.

Figure 7 is a schematic plan view showing the pawl disengaging mechanism.

This application is a continuation of my pending application Serial No. 380,528 filed February 25, 1941.

Figure 1:
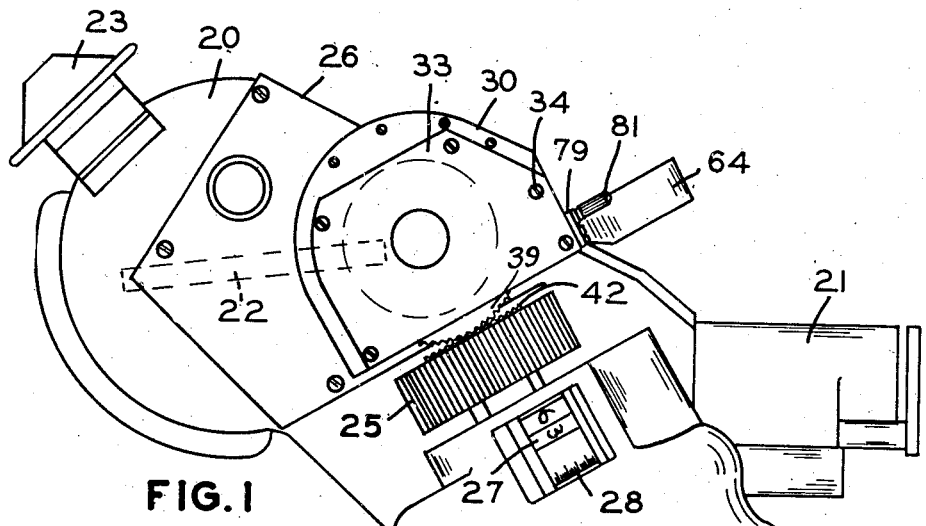
Figure 1 is a side elevation of a navigational instrument having the median device of my invention associated therewith.

To show the general application of the median device, its use with a measuring instrument, a bubble octant or bubble sextant, has been illustrated in Figure 1 although it is to be understood that it may be employed with other types of instruments and may in fact be utilized separately of any instrument. Instruments such as that disclosed are used in the art of navigation to determine the altitude of some celestial body. The customary practice is to make a number of altitude observations with the instrument, the mean or median value of which group of measurements is employed in computations of latitude and longitude. An instrument of this type with which my median device may be associated is disclosed in Patent No. 2,080,851 issued to George B. Gailasch and Henry F. Kurtz on May 18, 1937 for a sextant.

The instrument shown in Figure 1, which may be either a sextant or an octant, includes the usual body 20, sighting telescope 21, tiltable index reflector 22 and eyepiece 23. A suitable handle 24 is fixed on the side of the body and a knurled operating wheel 25 is rotatably mounted near one end of the handle. This wheel 25 serves as a drive means for actuating the reflector 22 through suitable gearing, not shown but mounted within housing 26, and also drives a registering device 27 carried on the instrument. The register or counter 27 is visible through a window 28 in the handle 24 and is adapted to indicate the angular position of the reflector 22. Structures of this nature are well known to the art and their exact details are not intended to form a part of the present invention except insofar as they combine with my median device to form a novel measuring instrument.

The mechanism forming my median device is mounted within a suitable housing having a body 29 which is secured by screws or other fastenings 30 to the face of the housing 26. A window 31 of transparent material forms the front of the housing while its back and open sides are closed, respectively, by plates 32 and 33, screws 34 or other means securing these members to the housing body. Window 31 is provided upon its interior surface with a fiducial line 35, the purpose of which will hereinafter appear. A suitable light source indicated at 31' on housing 26 is used when needed, to illuminate the window 31. Energy for this light source may be supplied from a battery (not shown) carried in the handle 24.

As may be noted in Figure 3, the cover plate of the housing 26 and the side plate 33 are provided with aligned bearings 36 and 37 which rotatably support a shaft or operating member 38. A gear 39 is mounted on shaft 38 for rotation therewith by having its hub secured to the shaft by means of a set screw 40. Gear 39 is of a relatively large radius and is permitted to extend outside of the housing by providing back plate 32 with a suitable slot 41. This gear 39 is adapted to mesh with gear teeth 42 provided, in any suitable manner, upon the operating wheel 25 so that the latter may be utilized to rotate the gear 39 and shaft 38. In this connection it should be observed that operating wheel 25 serves as a drive means for the reflector 22, register 27 and shaft 38, and also that independent rotation of the shaft or operating member 38 will cause the operating wheel, register and reflector to be actuated.

Figure 2:
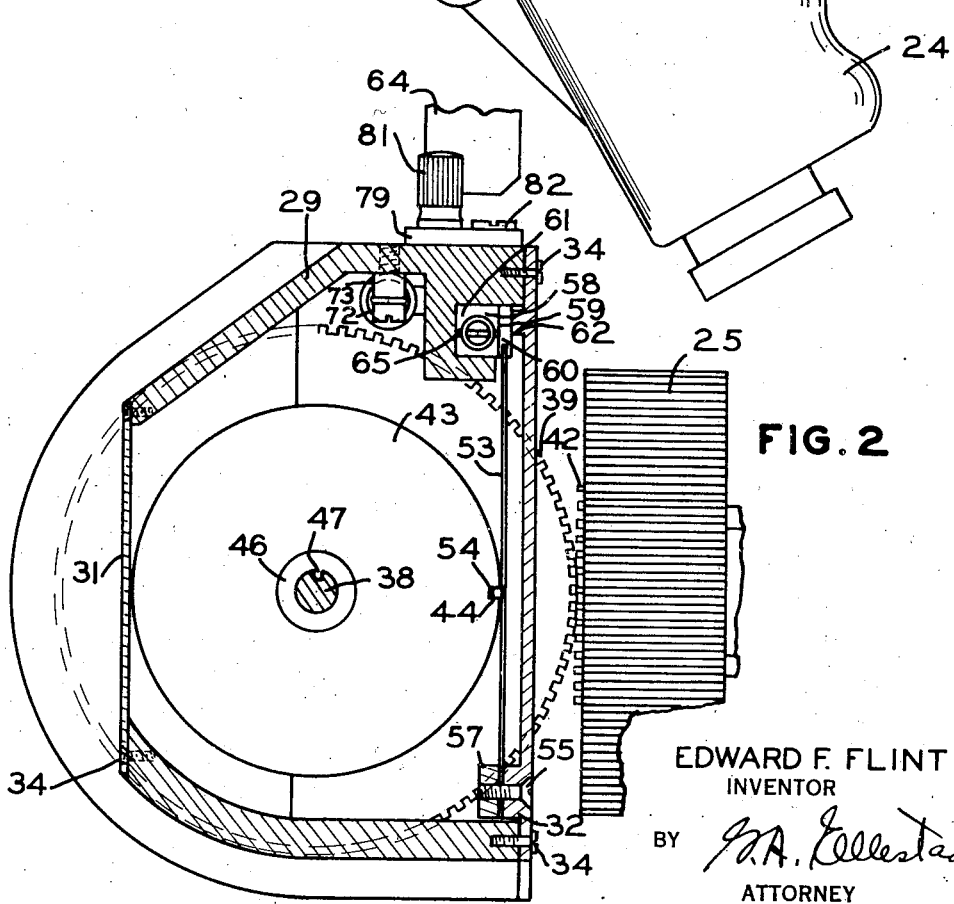
Figure 2 is a sectional elevation of the median device and also shows the drive means for actuating it.

Loosely mounted upon the shaft 38 are a plurality of indicating members or disks 43, each one of which, as best shown in Figure 2, is provided with a notch 44 in its peripheral surface. Also, as noted in Figure 4, each indicating member 43 is provided with an index mark 45 located on its peripheral surface at a position where it may be best observed through the window 31. The position of the notch 44 with respect to the index mark 45 is the same for each indicating member.

The number of disks 43 on the shaft 38 is limited only by the practical size of the median device. In keeping with the basis of median determination, I preferably employ an odd number of disks 43, seven of these indicating members being illustrated in the drawings.

While disks 43 are loosely placed upon the shaft 38, they are normally held thereon for rotation therewith by a construction which mounts washers 46 upon the shaft between adjacent disks. One end washer is employed adjacent the plate 33, the hub of the gear 39 serving as a washer at the other end of the shaft. Each washer 46 is provided with a lug or projection 47, illustrated in Figure 2, which cooperates with a longitudinal groove formed in the shaft and serves to key the washer to the shaft. The end of the shaft adjacent the bearing 37 is threaded as at 48 and has a nut 49 engaged therewith. A spring 50 is mounted on the shaft between nut 49 and the end washer 46. Obviously the position of the nut will determine the pressure imparted to the washers 46 and indicating members 43. This pressure is adjusted until the friction between the shaft 38 and the indicating members is sufficient to cause them to rotate with the shaft on the rotation of that latter member. It is to be noted, however, that the engagement between the shaft and each disk 43 is of such nature that the shaft may be rotated relative to any disk which is held in a fixed position.

During the operation of my mechanism there are times when it is necessary that either all or only some of the disks 43 be held or locked against rotation with the shaft 38. Means for holding the disks stationary include the spring detent member, generally indicated by the reference numeral 51, which is provided with a base 52 from which the spring detent fingers 53 extend as may be observed in Figure 5. The number of clamping fingers 53 is equal to the number of disks, seven being shown in the drawings. Each finger is provided with a lug or detent 54 adapted to engage a notch 44 in a disk 43. Detent member 51 is secured to the back plate 32 by screws 55 which extend through the openings 56 formed therein and engage a clamp block 57 in the manner shown in Figure 2.

The detent member 51 is so mounted that its fingers 53 will tend to assume positions which are perpendicular to the longitudinal axis of the shaft 38. Under such circumstances each indicating member 43, when positioned as shown in Figure 2, will have its notch 44 engaged with the lug 54 on its respective detent finger 53 so that the disk will be held stationary.

During the use of median device the indicating members 43 are adapted to be freed for rotation with the shaft 38 in a consecutive order beginning with the inner disk 43 or that furthest to the right in Figure 3 and working outwardly from the body 20 of the instrument or towards the left of Figure 3 until all of the disks have been freed. This necessitates moving each detent finger out of its engaging position with its disk. To accomplish this purpose, I make use of movable cam means comprising an elongated sliding cam member 58, usually of rectilinear cross section, having a side 59 which provides a cam surface for holding the detent fingers 53 out of engagement with their disks 43. The left or outer end of the slide 59, as viewed in Figure 3, is provided with a bevelled portion 60.

Cam member 58 is slidably mounted within a slideway 61 formed in the top of the body 29 of the housing for the median mechanism, one side of the slideway being formed by a projection 62 on the back plate 32 of the housing. In Figures 2 and 3, the detent fingers 53 and the slideway 61 are shown in overlapped relation. Thus each detent finger 53 will be forced over the bevel 60 and onto the surface 59 as it is contacted by the cam member during movement of the latter. The cam member 58 is so located that its surface 59 will engage a detent finger to hold it in a position wherein its lug 54 is freed from engagement with its cooperating disk 43 and the latter is allowed to rotate with the shaft 38. As will appear later, the surface 59 is of a length sufficient to engage all of the fingers 53 simultaneously so that all of the indicating members 43 may rotate with the shaft 38.

Movement of the cam member 58 is controlled by a spring 63 which normally tends to hold the cam surfaces out of contact with the detent fingers and by suitable means, actuated by handle 64, for moving the cam member against the action of the spring. This spring 63 is mounted within a bore which extends through the cam member 58. One end of this spring is secured to the cam member by a pin 65 and its other end is secured to a post 66 located within the slideway 61. A stop screw 67, which extends through the wall of the slideway 61, by limiting the movement of the sliding cam member, causes the spring 63 to be always maintained under tension to constantly urge the cam member away from the detent fingers 53.

Figure 8:
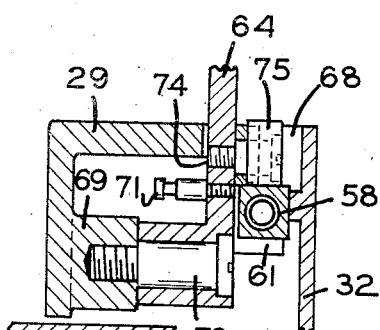
Figure 8 is a sectional view on the line 8—8 of Figure 3.

Movement of the sliding cam member 58 towards the detent fingers 53 is effected by the operating handle 64 which extends through an opening 68 in the top of the body 29 of the housing for the median mechanism. Opening 68 is located to extend through a portion of the housing over the slideway 61 for the cam member 58. The means for mounting the handle 64 as well as the contour of the opening 68 are best observed in Figures 3, 7 and 8, details of the handle mounting being omitted from Figure 2 for the sake of clarity. A boss 69 which depends from the body 29 of the housing is used to support a pivot screw 70 upon which the lower end of the handle is mounted as shown in Figures 3 and 8.

Near the pivot of the handle there is secured a post 71 to which is connected one end of a spring 72 employed to maintain the handle in an inoperative position. The other end of spring 72 is attached to post 73 secured to the interior of the housing by any suitable means.

Also mounted upon the handle by a screw 74 is a pawl mechanism 75 which is constantly urged, by spring operated means for example, into engagement with notches 76 formed on the top surface of the cam member 58. A second pawl mechanism 77 similar to that already described is secured by a screw 78 to the wall of the opening 68 to the right of or inwardly of the pawl 75 as shown in Figure 3.

Trip mechanism for disengaging pawls 75 and 77 from notches 76, when it is desired, includes a slide 79 having a guide slot 80 and operating knob 81, best illustrated in Figure 7. This trip device is mounted upon the top of the body 29 of the housing by screws 82 which extend through slot 80 and engage the housing to hold the device in sliding contact therewith. Slide 79 is mounted in such position that upon its inward movement its end will contact pawls 75 and 77 to free them from engagement with the notches 76 and release the cam member 58 for movement under its spring 63. On reverse movement of the sliding trip 79, the pawls will return to their engaging position with the notches 76 due to their already described construction.

Operation of the detent disengaging means may be best understood by reference to Figures 2, 3, 6 and 7, directional description of the movement of the parts of the device being made with respect to Figure 3. Clockwise movement of handle 64 will free pawl 75 from the notch 76 in the cam member 58 with which the pawl is shown engaged and will allow it to engage the next inner notch or notch to the right. Handle 64 moves in the portion 83 of the opening 68 in the housing. The length of this portion of the opening is chosen to limit each stroke of the handle to an amount just sufficient to move pawl 75 from the notch 76 with which it may be engaged to the next adjacent notch on the right thereof. During the movement of the pawl 75, the cam member 58 is held against movement to the right by the pawl 77.

The spring 72 is strong enough to return the handle 64 to its position shown in Figure 3 following movement of the handle to the right. This return movement of the handle advances the cam member 58 towards the left by a distance of one notch and causes the bevel 60 of the cam member to contact the end of the detent finger 53 on the right and move this finger to free its lug 54 from notch 44 in the right hand or first indicating member 43. Usually the cam member 58 is so designed and located that each detent finger will ride over the bevel 60 and onto the flat cam surface 59 for the stroke of the operating handle which frees it from engagement with its indicating member. The dotted lines in Figure 6 show this condition with the cam member advanced to a point where the detent of the second finger 53 is riding on the bevel portion 60 of the cam member and the detent of the right hand finger is riding on the flat 59.

Continued actuation of the handle 64 continues to advance the cam member 58 to the left. On completion of the seventh stroke of the handle, all of the seven detent fingers 53 have been pushed and are being held out of engagement with their respective indicating members 43, which latter are now permitted to rotate with the shaft 38. It is to be observed that as the cam member is advanced, it moves the detent fingers to inoperative positions in a selected order beginning with the inner or right hand finger 53 and that as each indicating member 43 is released it will rotate with the shaft 38 although other indicating members may be still held against rotation.

When the seventh detent finger has been freed, the pawl 77 is engaged with notch 76', the seventh notch to the right of that shown engaged by this pawl in Figure 3. No harmful effect will be produced by the continued operation of the handle 64. For example, an eighth operation of the handle will cause pawl 75 to move cam member 58 by one notch as usual. In this instance as there are no notches for the pawl 77 to engage, it will ride on the flat upper surface 84 of the cam member when the handle returns to the left. Obviously this just described movement will not disturb detent fingers 53 from their inoperative position as they are still in contact with the relatively long cam surface 59 of the sliding cam member.

Pawl 75 is released from engagement with the cam member if handle 64 is moved to the right for a ninth operation. As the pawl 77 after the eighth operation of the handle is resting on the flat surface 84, the spring 63 will cause the cam member to be moved to the right. Its movement, however, will be arrested by the pawl 77 engaging the notch 76' as the latter moves under the pawl. When handle 64 is allowed to return to its inoperative position, it will again move the cam member to the left and will again cause pawl 77 to ride upon the flat surface 84 in a manner like that described in connection with the eighth stroke of the handle. Additional strokes of the handle will only cause a repetition of these movements of the cam member. During any of the movements just described, the detent fingers remain in their disengaged position and none of the indicating members 43, which are free to rotate with their shaft 38, are in any way affected by inadvertent handle operation.

When it is desired to relock the indicating members, sliding trip member 79 is moved inwardly or to the right as viewed in Figure 3 to move pawls 75 and 77 out of engagement with the cam member 58. This permits spring 63 to pull the cam member back to the position shown in Figure 3 and also releases the detent fingers 53 for engagement with their respective indicating members. Each detent finger, due to its resiliency, will tend to assume the position shown in Figure 2 and will be engaged by its respective indicating member 43 when the notch 44 on the latter is in alignment with the lug 54. Rotation of shaft 38 will still cause unengaged indicating members to be rotated until the notches 44 therein are brought opposite to their respective detents which will then snap into place to hold these indicating members against rotation.

Operation of my median device may be well understood in connection with its use with some instrument, for example, the bubble octant upon which it is mounted in Figure 1. In the normal employment of a bubble octant, a group of observations or readings are made and are then averaged. I effect a similar result with my median device by causing the counter 27 to indicate the median value of such a group of readings following the making of the last observation.

It is essential to the successful operation of my device that all of the indicating members 43 be in their clamped position prior to determining the median of a group of measurement observations. When such is the case it is to be noted that all of the index marks 45 on the indicating members are in alignment with each other. With the sliding cam member 58 in an inoperative position, rotation of operating wheel 25 by a full revolution will assure the attainment of this condition.

When using a median device like the one which I have illustrated, I make seven observations with the bubble octant in the usual way. The operating wheel 25 is manipulated in the customary manner with instruments of this nature to set the index reflector 22 at the proper angle in making the first measurement and in fact in making all of the succeeding observations. The operating wheel 25 will not only actuate reflector 22 and register 27 but will also rotate the shaft 38 which is the main operating member for the median device. For each reading, shaft 38 will be rotated or moved in accordance with the measurement made by the instrument or by an angular amount which is proportional to the angular movement of the reflector 22, the actual angular movement of shaft 38 being dependent upon the gear ratio between gears 39 and 42. It should be here noted that the gear ratio existing between gears 39 and 42 is chosen to permit practical design of the median mechanism and is immaterial to its operation.

Upon the first observation, shaft 38 is rotated relative to the indicating members 43, none of these latter being moved since they are locked. Handle 64 is pushed to the right, as viewed in Figure 3, following the first reading and is then released to free the right hand or first indicating member 43 for rotation with its shaft 38. There is no necessity for an observer to consult register 27 until the median has been located although a value for each observation is given thereon. Also it is immaterial where the register and hence the reflector 22 may be set prior to making any reading.

The wheel 25 is not manipulated in making the second instrument observation. This causes the shaft 38 and right hand indicating member 43 to rotate together but relative to the remaining indicating members, which latter are stationary. On the first observation, any point on the shaft 38 is moved or rotated from its initial position by an amount which is in accordance with the observation or is proportional to the angular movement of the reflector 22. On the second observation, this just assumed point is moved from its first displaced position by an amount in accordance with the difference in value of the first and second observations. However, the first or right hand indicating member rotates with the shaft during the second observation. Hence any point or reference such as the index mark 45 on the first indicating member will be displaced from its initial position by an amount proportional to the movement of the shaft 38 for the second observation or by an angular amount proportional to the difference between the first and second observations.

The second reading being completed, handle 64 is actuated to release the second indicating member from the right for rotation with shaft 38. It may be here observed that handle 64 is always operated immediately following the making of any reading to unlock or release the indicating members corresponding in number to that observation.

Assuming rotation of the movable member 38 when making the observation for the second reading, it may be noted that the index mark 45 on the first indicating member is moved out of alignment or is advanced to one side or the other of the aligned index marks on the remaining indicating members. When the second indicating member is released, this relative position between the index mark of the first indicating member and that of the second indicating member is maintained upon rotation of the shaft 38 since both the first and second indicating members will now move or rotate together. In fact, as will later become apparent, any index mark which has been displaced from its initial alignment will throughout the remaining operation of the median device, maintain its relative displacement with respect to the index mark on the indicating member to its left after this latter has been unclamped for rotation with the shaft 38.

When wheel 25 is operated to take the third reading, shaft 38 and both the first and second indicating members are rotated with it by an angular amount in accordance with the difference between the values of the second and third observations. This displaces the index mark on the second indicating member out of alignment with the stationary index marks by the amount noted. It also displaces the index mark on the first indicating member from its position at completion of the second observation by a like angular amount. Under these conditions the relative displacement between the first and second index marks will remain unchanged from that which existed between these marks after the second observation and while the second index mark was in its initial aligned position. It hence follows that the separation of these two marks after the third reading is a measure of the difference between the first and second observations and that the first index mark may be considered as representing the first observation and the second index mark the second observation.

Following the third reading, the handle 64 is actuated to unlock the third indicating member and the fourth, fifth, sixth and seventh observations are next made, the handle 64 being operated upon completion of each of these latter. Movement of the indicating members 43 and shaft 38 similar to that described occurs when these latter sights are made. For example, as each of these observations is made the indicating member just previously released is displaced from its initial position by an angular amount proportional to the difference between the observation being made and the just preceding observation. The other unlocked indicating members are, of course, moved by a like amount so that their index marks maintain their same relative positions with respect to each other.

Figure 9:
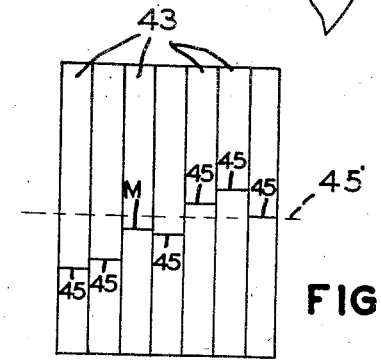
Figure 9 is a schematic representation of the indicating members of my device and shows the relative positions of their index marks following operations to determine the median of a group of measurements.

The device which I have described is illustrated as limited to finding the median of seven values. After unlocking the seventh indicating member from the right or the left hand indicating member as viewed in Figure 3, any movement of shaft 38 will displace all of the indicating members relative to their initial position of alignment by equal amounts so that their relative positions with respect to each other will remain unchanged. These conditions, after unclamping the seventh indicating member are represented in Figure 9 which is a schematic front view of the peripheral faces of the indicating members following the location of the median for some group of measurements. This view shows the positions of the index marks relative to each other and also with respect to their initial position of alignment which is represented by the dotted line 45'. As may be observed, the displacement between any two index marks, whether they are adjacent or not, will be a measure of the difference in the value of the readings which those particular marks represent.

Obviously, displacement of the index marks from the relative positions which they occupy with regard to each other on completion of the final observation, will introduce error into the median value to be evaluated. The mechanism described for controlling the cam member 58 provides an effective means to prevent such displacement should additional observations be inadvertently made. This is due to the construction which maintains the detent fingers 53 in disengaged position until actuation of the trip slide 19. While the detent fingers 53 are disengaged, the shaft 38 may be rotated at will without disturbing the relative positions of the index marks 45 with respect to each other.

An inspection of Figure 9 will show the medially located index mark M as appearing on the first indicating member 43 from the left. This indicating member corresponds to the third indicating member from the right as shown in Figure 3 since Figure 9 is taken from the side of the device which is opposite to that disclosed in Figure 3. While the index mark M indicates the relative size of the median when compared to the other observations, it fails to give the magnitude of the median in quantity units.

This magnitude of the median is readily determined by operating the wheel 25 to rotate the shaft 38 until the index mark M is brought into coincidence with the fiducial line 35 formed on the window 31. Figure 4, also a front view, shows the median mark M or the fourth indication of relative size, as positioned on the fiducial line 35. Shaft 38 and gear 39 are rotated when the median mark M is moved onto the fiducial line and they cause operation of register 27. The latter will then indicate directly the value of the median of the seven observations in terms of angular measurement.

Obviously, the median index mark need not be located upon the particular indicating member shown in the drawings. It will be appreciated that it is the values of the measurements in a group that will determine which indicating member will have its index mark in the median position. There will be two index marks following the operation of my device which will be separated from each other, in a plane at right angles to the axis of shaft 38, by a greater distance than any other two index marks. These widely separated index marks represent extreme values between which there is a median value represented by a median mark.

The same number of index marks will be located on both sides of this median mark or the fiducial line, when the former is set to coincide with the latter, if all of the index marks are unaligned with respect to each other when in their unlocked positions. Obviously, the median may be found by locating the next three index marks which are the least displaced from either extreme mark. The median will thus be represented by the fourth mark of a group of seven, counting an extreme mark as the first mark.

It is possible for unequal numbers of index marks to be located on opposite sides of the fiducial line if several of the index marks are in alignment after working a group of measurements. In this instance the same procedure is followed by counting from one extreme to the fourth index mark. The fact that several marks may be aligned is immaterial and they are counted as separate marks. Should one or more index marks be in alignment with the fourth or median mark, they are also set on the fiducial line in evaluating the median.

It will now be apparent that the ratio between the gears 39 and 42 is immaterial to the operation of the device. However, the maximum displacement of any index mark 45 from its initial position will depend on this gear ratio. This ratio is preferably selected to accommodate the maximum displacement to be normally expected for any mark in order that each index mark may be observed through the window 31 before locating the median. Also it may be noted that the location of the index marks 45 with regard to the notches 44 is dependent upon the mechanical design of the median device.

Any suitable reference, such as a single line or double lines, may be employed as fiducial indicia. When a single line is used it is located so as to be opposite to and parallel with the index marks

45 when they are in their initial positions of alignment.

Following the rotation of the register 27 to obtain the magnitude of the median, the device is prepared for making another set of observations. This is accomplished by operating the trip mechanism 79 to release all of the detent fingers 53 for reengagement with the indicating members 43. The latter are rotated until all of them are in their clamped condition so that all of the index marks 45 are again held in alignment with each other.

Means other than those disclosed for disengaging the detent fingers 53 may be employed with my invention. Figures 10-13 disclose a modified form of such mechanism associated with a median device substantially similar to that heretofore described, the elements thereof which are illustrated comprising the body 29 of the housing for the mechanism, side plate 33, spring detent fingers 53 and indicating members 43. The detent fingers are shown in dotted lines in Figure 10, a view similar to Figure 3, to indicate their position with regard to the means for unclamping them while the indicating members 43 have been omitted from this view to simplify the drawing.

In place of the single movable cam member 58 shown in the earlier views of the drawings, I make use of a plurality of cam members 85 mounted on a cam shaft 86 for rotation therewith. Cam shaft 86 is supported in bearings 87 carried by brackets 88 secured to the body 29 of the housing and is located so that its axis is at right angles to the axis of each detent finger 53 as may be observed in Figure 13. The number of cam members 85 is equal to the number of indicating members 43 used with the mechanism.

Figure 10:
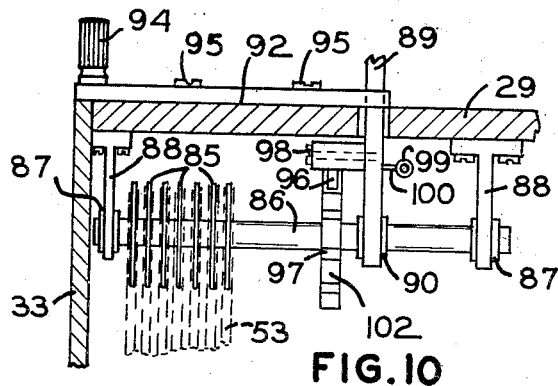
Figure 10 is a partial section of a modified form of median device.

Seven cam members have been shown in Figure 10, each one of which on its rotation is adapted to contact its respective detent finger 53 to disengage the same from the indicating member 43 with which the detent finger is associated. The detent members are selectively moved into their inoperative positions in consecutive order beginning with the clamping member 58 on the right of Figure 10 and are held in such positions while the median for a group of observations is located. For this reason the working faces of the cam members 85 vary in peripheral length, the cam member with the longest working face being the right hand cam and that with the shortest working face being the left hand cam of Figure 10. While the detent fingers have been disclosed as disengaged in a consecutive order, it will be appreciated that this may be accomplished in any order desired by the suitable location of the cam members 85 on their shaft.

Figure 11:
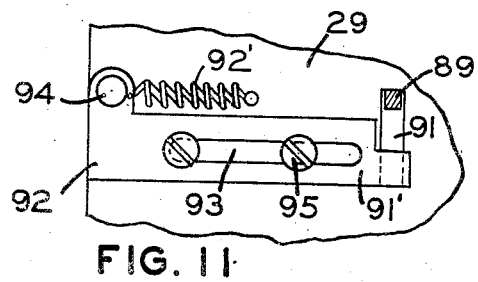
Figure 11 is a partial plan view of the modification of Figure 10.
Figure 13:
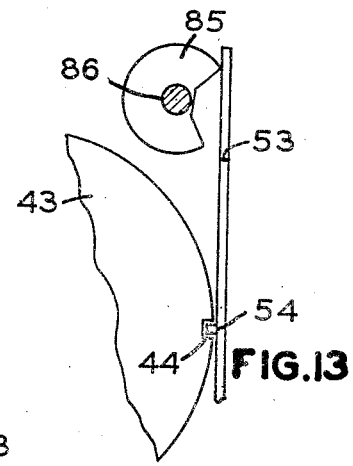
Figure 13 is a partial sectional view showing the cam means used in Figure 10 for freeing the detent fingers from engagement with the indicating members of the device.

Means for rotating the cam shaft comprises an operating handle 89 loosely mounted on cam shaft 86 between collars 90. Handle 89 extends through an opening or slot 91 formed in the top of the body 29 of the housing. A portion of this slot 91 is normally covered by a sliding closure member 92 which limits the stroke of handle 89. As best shown in Figures 10 and 11, the closure member 92 is provided with a guide slot 93 and operating knob 94 and is slidably mounted upon the top of the body 29 by screws 95 which extend through the guide slot. Spring 96, connected to knob 94 and the body 29 of the housing, normally maintains the closure member in a position so that its extension 91' covers a portion of the opening 91.

The operating connection between the handle and the cam shaft is effected by a pawl 96, supported on handle 89, which is adapted to engage a toothed wheel 97 fixed on cam shaft 86 to rotate therewith. Pawl 96 is pivoted on a screw 98 secured to the operating handle and is normally maintained in engaging position with the notches of wheel 97 by suitable spring controlled means, not shown in the drawings. Use is made of a spring 99 connected to a pin 100 on the operating handle and to the interior of the housing body to normally hold the operating handle in an inoperative position.

Toothed wheel 97 is provided with teeth 101 which are set at intervals 102 and 103 from each other, a separate tooth being provided for each indicating member. The interval 103 is greater than any interval 102, all of which latter are of equal length. By a suitable selection of the length for the intervals 102 and for the stroke of the handle 89, cam members 85 may be caused to selectively disengage their respective detent fingers 54 from the indicating members 43 in consecutive order upon each forward or clockwise stroke, as viewed in Figure 12, of the handle 89.

The operation of my median device when using the modified form of disengaging means for the detent fingers is similar to that heretofore described. For example, in the use of an octant equipped with my median device having the disengaging means of Figures 10-13, the handle 89 is pushed forwardly following each octant observation to cause an indicating member 43 to be freed for rotation with its drive shaft. Upon each return stroke of the handle 89, with the exception of its return from the forward stroke which releases the last indicating member, the pawl 96 will be engaged with a tooth 101 adjacent to that from which it has just been disengaged. Friction between the bearings 87 and the cam shaft and the drag of the detent fingers on the cam members 85 is sufficient to overcome movement of the cam shaft on each return stroke of the handle 89.

Figure 12:
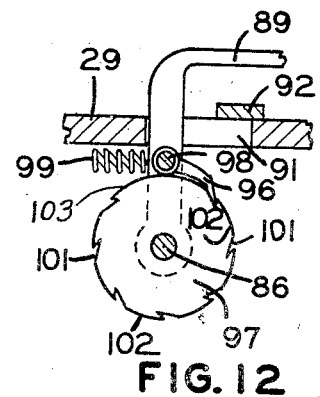
Figure 12 is a sectional face view of the cam operating mechanism shown in Figure 10.

Figure 12 shows pawl 96 engaged with a tooth notch next adjacent to the interval or surface 103. In this connection, movement of the wheel 97 on the forward stroke of handle 89 will unclamp the single indicating member still held by the only detent finger 53 remaining in locking position. However, upon the return of the handle 89, pawl 96 will ride on the surface 103 since the interval between teeth at this portion of the wheel 97 is greater than the stroke of the handle or the normal distance 102. Forward movement of the handle is limited by the length of the opening 91 so that its continued actuation after the pawl has been moved onto the blank portion 103 of the toothed wheel will obviously have no tendency to rotate the toothed wheel or the cam shaft 86. I am enabled by this expedient to provide this form of the invention with means which prevents the disturbance of the relationship between the index marks of the indicating members by accidentally or inadvertently making an excess number of observations with the instrument.

The magnitude of the median value is found in the manner already described and after its notation, the median device is ready to be returned to its initial condition for operation with a new group of observations. As pointed out, continued actuation of the handle 89 following the release of the last held indicating member will not rotate the toothed wheel. However, when slide 92 is retracted to uncover the opening 91, the length of the handle stroke may be increased by an amount sufficient to move the toothed wheel. The movement effected by this increase in stroke permits the other tooth, adjacent to surface 103, to be moved to a location where its notch will be engaged by the pawl when the handle is in an operative position. This last operation moves all of the cam members 85 out of contact with their respective detent fingers 53 and upon its completion, the slide 92 is released to return to its position shown in Figure 11. The detent fingers 53 may now be assured of engagement with their indicating members by proper rotation of the shaft upon which the latter are secured.

As previously noted, the number of measurements which may be worked by my device is controlled only by the number of indicating members which may be fitted into a practical design. I have shown a machine with a capacity for seven values which, however, is adaptable for working a group of more than seven measurements. For example, twenty-one values may be worked in three groups to locate the median for each seven readings. The median values thus determined may be averaged or a median of them may be taken. In any event, this last mentioned value may be used as representative of the group of twenty-one measurements.

Of course, measurements of a number less than the capacity of the device can quite obviously be worked by the mechanism I have shown. For example, if the device is operated for only five values, only five indicating members will be freed for movement together and the median of the values may be located in the manner already described. The fact that two of the indicating members are in clamped position will not interfere with the operation of the mechanism to find the median of the five values which have been worked.

It is to be noted that my invention is not necessarily limited to working with an odd number of measurements. Where there is a group composed of an even number of observations there will be two middle values represented by the positions of the two middle index marks. The median for such a group is readily determined by rotating the drive shaft for the device to cause the middle index marks to be located at equal distances from but on opposite sides of the fiducial line.

From the foregoing it will be apparent that I have provided a median device of simple design and facile operation which is adaptable for use in many different arts. Besides its employment with the navigational instruments disclosed, some few of its applications may be found in its association with sextants, ground speed indicators for aeronautical use, transits, theodolites, other measuring instruments such as spectrometers and photometers as well as its adaptation for use in the art of gunnery in connection with range finding and with calculations involved in setting gun and bomb sights. Moreover, as previously pointed out, my invention is not limited to use with a measuring instrument but may be operated independently of such an instrument to find the median of some group of measurements which have been previously determined in any possible manner. Obviously, in the adaptation of my device to uses with different quantities which involve different measurement units, it is only necessary to calibrate the register employed to indicate the median in terms of the unit desired.

I claim:

1. A device for determining the median of a group of quantitative measurements comprising operating means movable for making said measurements, movable indicating means operatively connected to said operating means and seriately movable thereby in accordance with movement thereof in making each measurement of the group, said indicating means being constructed and arranged to indicate independently the value of each measurement of said group, and means for determining the median value of the group of measurements indicated by the relative positions of said indicating means.

2. A device for determining the median of a group of quantitative measurements comprising operating means movable for making said measurements, a plurality of movable indicating members, means for seriately moving each of said indicating members independently by and in accordance with the movement of said operating means for each measurement, and means for determining the median value of the measurements indicated by the relative positions of said indicating members with respect to each other.

3. In an octant having a movable index reflector, operating means for moving the reflector, and means for indicating the position of the reflector, the combination of a plurality of movable indicating members, means for moving each of said members independently by and in accordance with the movement of said operating means for each position of the reflector, and means for determining the median value of the positions of the reflector indicated by the relative locations of the indicating members with respect to each other.

4. A device for determining the median value of a group of quantitative measurements comprising movable indicating members of a number sufficient to each represent a measurement in said group, means for normally maintaining the members in a null position, movable means for seriately releasing each member for movement from its null position, movable operating means for moving said members upon their release to indicate by the relative movements of the members to each other the relative magnitude of said measurements and means for determining the median value of the measurements indicated by the relative positions of the indicating members.

5. A device for determining the median value of a group of quantitative measurements comprising a plurality of indicating members, a movable operating member having said indicating members mounted thereon for movement therewith, driven means for moving the operating member in accordance with each measurement, locking means normally holding said indicating members from movement with said operating members, movable means for seriately freeing each member, movable member to permit it to move with said indicating member whereby to position said indicating members to indicate the relative magnitudes of said measurements by the relative displacement of the members with respect to each other and means permitting the determination of the position of the member representative of the median value of said measurements.

6. A device for determining the median of a group of quantitative measurements comprising a rotatable shaft, drive means for rotating the shaft in accordance with each measurement, a plurality of indicating disks mounted on the shaft and frictionally engaged thereto for rotation therewith, resilient detent fingers normally engaging notches in the peripheries of the respective disks for holding the disks against rotation with the shaft, movable means for disengaging the detent fingers to selectively free one disk at a time for rotation with said shaft whereby to position the indicating disks to indicate the relative magnitudes of said measurements and means for determining the median value of the measurements indicated by the disks.

7. In a device for determining the median of a plurality of measurements of an instrument, the combination of indicating members movable in accordance with the difference between successive measurements by the instrument, an index mark on each indicating member, locking means normally holding said indicating members stationary, movable means for seriately releasing said indicating members for movement following each measurement by the instrument whereby to position said index marks to indicate the relative magnitudes of said measurements by the relative displacement of the index marks with respect to each other and indicating means operable upon movement of said indicating members with respect to a fiducial line and while being maintained in their said relative positions for translating the relative value of the index mark representative of the median of said measurements into terms of quantity units.

8. In a device for determining the median of a plurality of measurements of an instrument, the combination of an operating member movable in accordance with each measurement of the instrument, a plurality of indicating members mounted on said operating member for movement therewith, an index mark on each indicating member, locking means normally holding said indicating members stationary on movement of said operating member, movable cam means for moving and holding said locking means in inoperative positions to permit each indicating member to be selectively freed for movement with said operating member whereby to position said index marks to indicate the relative magnitudes of said measurements by the relative displacement of the index marks with respect to each other, means cooperating with said cam means for preventing the release of the locking means from inoperative positions on continued actuation of the cam means after it has freed all of said indicating members, and indicating means operable upon movement of said indicating members with respect to a fiducial line and while being maintained in their said relative positions for translating the relative value of the index mark representative of the median of said measurements into terms of quantity units.

9. A device for determining the median of a group of quantitative measurements comprising a housing, a shaft rotatably mounted therein, drive means for rotating said shaft in accordance with each measurement, a plurality of indicating members mounted upon said shaft and frictionally engaged thereto for rotation therewith, an index mark on each indicating member, resilient detent means mounted in said housing and normally engaged with each indicating member to hold the same stationary upon the rotation of said shaft, independently operated cam means movable to disengage said detent means to selectively free one indicating member at a time for rotation with said shaft whereby to position the index marks of said indicating members to indicate the relative magnitudes of said measurements by the relative displacement of said index marks with respect to each other, and means having a fiducial line thereon for permitting the determination of the index mark representative of the median of said measurements.

10. A device for determining the median of a group of quantitative measurements comprising a housing, a shaft rotatably mounted therein, drive means for rotating said shaft in accordance with each measurement, a plurality of indicating members mounted upon said shaft and frictionally engaged thereto for rotation therewith, an index mark on the periphery of each indicating member, means in said housing for maintaining the indicating members stationary with respect to the rotation of said shaft comprising a plurality of resilient detent fingers respectively engaging notches on the indicating members when all of the indicating members are positioned with their index marks in alignment, independently operated cam means movable to selectively disengage each detent finger whereby to free said indicating members for rotation with said shaft to position their index marks to indicate the relative magnitudes of said measurements by the relative displacement of said index marks with respect to each other, and means having a fiducial line thereon for permitting the index mark representative of the median of said measurements to be visually determined.

11. In a device for determining the median of a plurality of measurements of an instrument, the combination of a housing, a shaft mounted thereon for rotation in accordance with each measurement, a plurality of indicating members mounted upon said shaft and frictionally engaged thereto for rotation therewith, an index mark on each indicating member, locking means mounted in said housing and normally engaged with each indicating member to hold the same stationary upon rotation of said shaft, independently operated cam means movable to disengage said locking means to selectively free one indicating member at a time for rotation with said shaft whereby to position the index marks of said indicating members to indicate the relative magnitudes of said measurements by the relative displacement of said index marks with respect to each other, and indicating means operable upon movement of said indicating members with respect to a fiducial line while being maintained in their said relative displacement for translating the relative value of the index mark representative of the median of said measurements into terms of quantity units.

12. A device for determining the median of a group of quantitative measurements comprising a housing, a rotatable shaft therein, drive means for rotating said shaft in accordance with each measurement, a plurality of indicating members on said shaft in frictional engagement to rotate therewith, an index mark on each indicating member, resilient detent means in said housing normally engaging with each indicating member to hold it stationary, means for freeing the indicating members comprising a guideway in said housing, a cam member slidable therein, manually operated means for moving said cam member to positions for contacting and disengaging said detent means to free one indicating member at a time for rotation whereby to permit the index marks to be positioned to indicate the relative magnitudes of said measurements by the relative displacement of the index marks with respect to each other, pawl means for holding said cam member in each of its contacting positions with said detent means, and means having a fiducial line thereon for permitting the determination of the index mark representative of the median value of said measurements.

13. In a median device, the combination of a rotatable shaft carrying a plurality of indicating members frictionally engaged thereto for rotation therewith, a plurality of resilient detent fingers each normally engaged with a different indicating member to hold it stationary on rotation of said shaft and means for selectively disengaging each detent finger, said means comprising a guideway, a cam member slidable within said guideway for contacting said detent fingers to push and hold them out of engagement with the indicating members as said cam member is moved, manually operated means for moving said cam member on each operation thereof by an amount sufficient to disengage a different detent finger and pawl means for holding said cam member in its contacting positions with respect to said detent fingers.

14. A median device comprising a housing, a rotatable shaft therein carrying a plurality of indicating members frictionally engaged thereto for rotation therewith, means for rotating said shaft in accordance with each measurement in a group of quantitative measurements, said means having a register to indicate the value of each measurement, a plurality of resilient detent fingers each normally engaged with a different indicating member to hold it stationary, a guideway having a cam member slidable therein to contact the detent fingers and to push and hold them out of engagement with the indicating members, said housing provided with an opening over said guideway, the cam member being formed with notches adjacent said opening, spring means normally maintaining the cam member out of contact with said fingers, a pawl on a wall of said opening normally engaged with a notch on said cam member, an operating handle for moving said slide extending through said opening and pivoted within said housing, a pawl on said handle for engagement with said notches, a window in said housing opposite the peripheries of said indicating members and a fiducial line on said window.

15. In a median device having a rotatable shaft carrying a plurality of indicating members frictionally engaged thereto for rotation therewith and a plurality of resilient detent fingers each normally engaged with a different indicating member to hold it stationary on rotation of said shaft, means for selectively disengaging said detent fingers comprising a rotatable cam shaft, cam members on said cam shaft to rotate therewith and each located at a position to contact a separate detent finger on rotation of said cam shaft to push and hold said detent fingers out of engagement with said indicating members, manually operated means for successively rotating said cam shaft by an amount sufficient to cause a different cam member to contact a different detent finger whereby to free the indicating members for rotation in a predetermined order.

16. In a median device having a housing, a rotatable shaft carrying a plurality of indicating members frictionally engaged thereto for rotation therewith and a plurality of resilient detent fingers each engageable with a different indicating member, means for disengaging said detent fingers comprising a rotatable cam shaft, cam members on the cam shaft each spaced opposite to a separate detent finger and fixed to rotate with the cam shaft to move the detent fingers out of engagement with the indicating members on rotation of said cam shaft, said cam members provided with contact surfaces of varying length and disposed to each other to contact said detent fingers in a predetermined order, said housing provided with an opening, an operating handle extending therethrough and pivoted on said cam shaft, a toothed wheel fixed on said cam shaft, a pawl on said handle adapted to engage said wheel, a closure member partially closing said opening by an amount sufficient to cause a different cam member to be rotated into contact with a different detent finger on an operating stroke of said handle and sliding means for mounting said closure whereby to increase the size of the length of the stroke of the handle.

17. A device for determining the median of a group of quantitative measurements comprising movable operating means for making measurements of a quantity, a plurality of movable indicating members, means for locking said indicating members against movement, means for seriately releasing said indicating members at each actuation of said operating means, means operatively connecting said operating means and said indicating members whereby successive movement of said operating means will move said indicating members as the same are seriately released for movement in accordance with successive movements of the operating means, and means for determining the median value of the measurements indicated by the relative positions of the indicating members.

18. A device for determining the median of a group of measurements comprising operating means movable for making various measurements, a plurality of movable indicating members, means for locking said indicating members against movement, means for seriately releasing said indicating members at each actuation of said operating means, means operatively connecting said operating means and said members whereby actuation of the operating means will move the indicating members as released independently in accordance with the movement of successive actuations of the operating means, means for determining the median value of the measurements indicated by the relative positions of the indicating members, and means for translating the median value when determined into terms of quantity units.

19. A device for determining the median value of a group of quantitative measurements comprising a plurality of indicating members, a movable operating member having said indicating members mounted thereon for movement therewith, means for moving the operating member in accordance with each measurement, locking means normally holding said indicating members from movement with said operating member, means for freeing said indicating members at each actuation of said operating member to permit the same to move with said operating member, means for holding successively moved indicating members against relative displacement upon subsequent movement of said member whereby the relative displacement of the adjacent indicating members indicates the relative magnitudes of successive measurements, and means for determining the median value of the measurements indicated by the relative positions of the indicating members.

EDWARD F. FLINT.